United States Patent [19]
Freeman

[11] 4,012,109
[45] Mar. 15, 1977

[54] HIGH MAGNIFICATION OPTICAL APPARATUS

[75] Inventor: Robin John Freeman, Woking, England

[73] Assignee: Vision Engineering Limited, Woking, England

[22] Filed: Nov. 29, 1971

[21] Appl. No.: 202,743

Related U.S. Application Data
[63] Continuation-in-part of Ser. No. 863,952, Oct. 6, 1969, abandoned.

[30] Foreign Application Priority Data
Dec. 12, 1968 United Kingdom ............ 59137/68
Aug. 19, 1971 United Kingdom ............ 38943/71

[52] U.S. Cl. .................................. 350/36; 350/9; 350/35
[51] Int. Cl.² ...................................... G02B 21/22
[58] Field of Search ............... 350/9, 36, 35, 120, 350/127–129

[56] References Cited
UNITED STATES PATENTS

| | | | |
|---|---|---|---|
| 1,864,946 | 6/1932 | Schrago | 350/129 X |
| 2,132,904 | 10/1938 | Martinez et al. | 350/120 |
| 2,348,818 | 5/1944 | Jacobson | 350/188 X |
| 2,410,757 | 11/1946 | Street | 350/36 |
| 2,588,373 | 3/1952 | Erban | 350/127 |
| 2,780,136 | 2/1957 | Erban | 350/120 |
| 2,846,918 | 8/1958 | Miles | 350/35 |
| 2,891,444 | 6/1959 | Ewald | 350/131 |
| 2,974,564 | 3/1961 | Miller | 350/120 X |
| 2,974,565 | 3/1961 | Miller | 350/120 X |
| 3,173,984 | 3/1965 | Vogl | 350/36 |
| 3,442,569 | 5/1969 | Bonnet | 350/137 |
| 3,453,035 | 7/1969 | Walther | 350/9 |

FOREIGN PATENTS OR APPLICATIONS

| | | | |
|---|---|---|---|
| 394,285 | 6/1933 | United Kingdom | 350/204 |
| 969,071 | 9/1964 | United Kingdom | 350/9 |

*Primary Examiner*—David H. Rubin
*Attorney, Agent, or Firm*—Dorfman, Herrell and Skillman

[57] ABSTRACT

The invention provides an optical device for use in microscopes and screen projectors comprising a screen formed with multiple lenticular surfaces mechanically traversed at a speed above persistence of vision in the light path between an object and an observation plane, the lenticular surfaces increasing the angle of light ray pencil egress from their angle of incidence to an extent rendering the use of eyepieces unnecessary.

6 Claims, 10 Drawing Figures

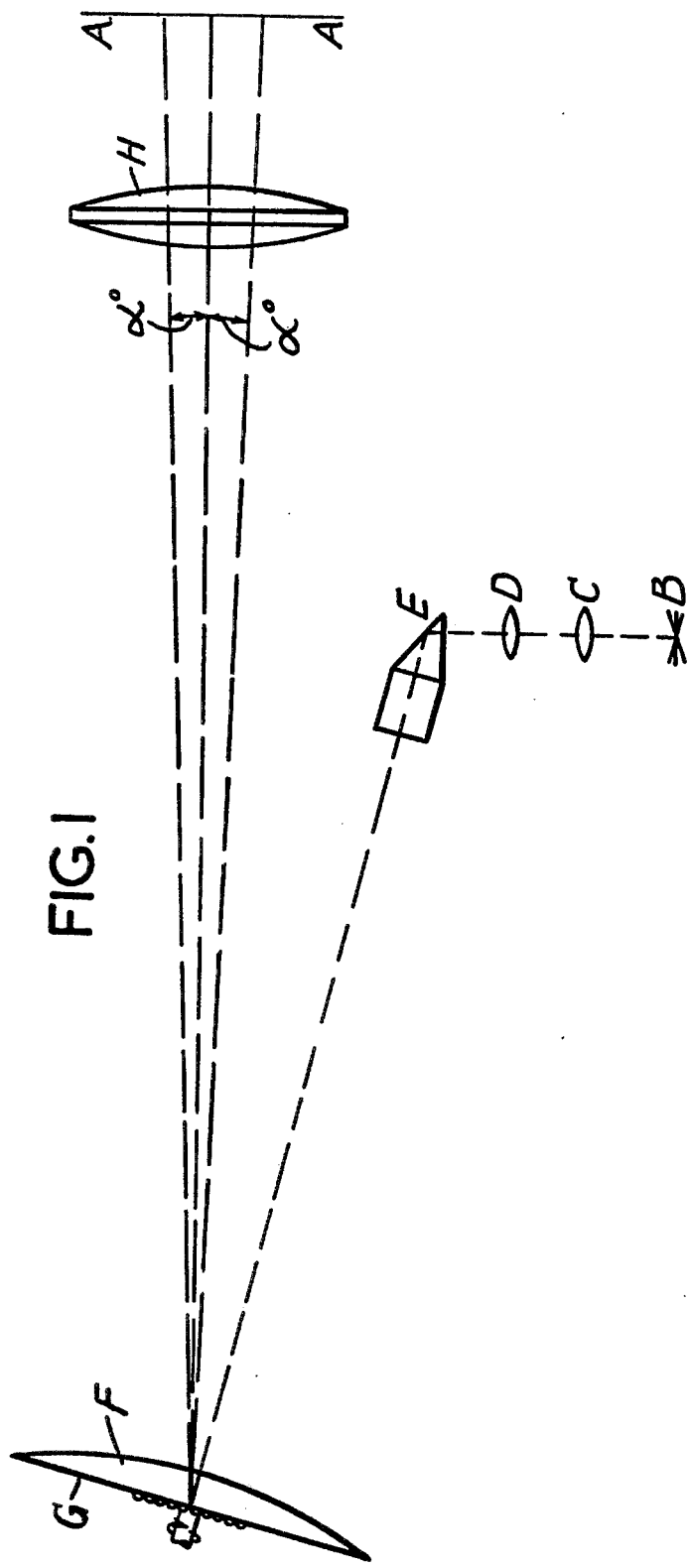
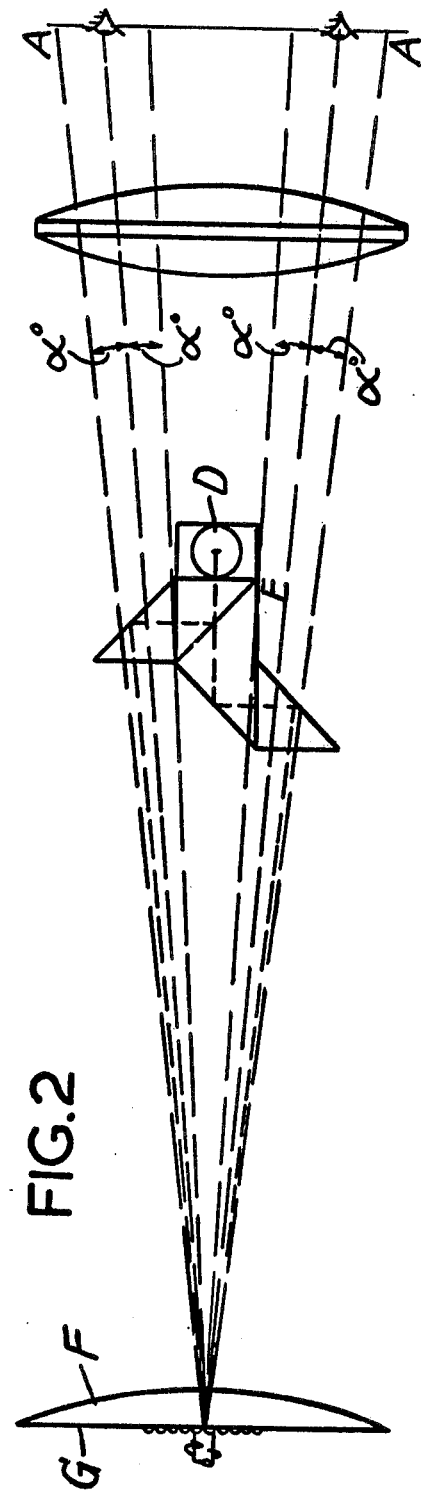

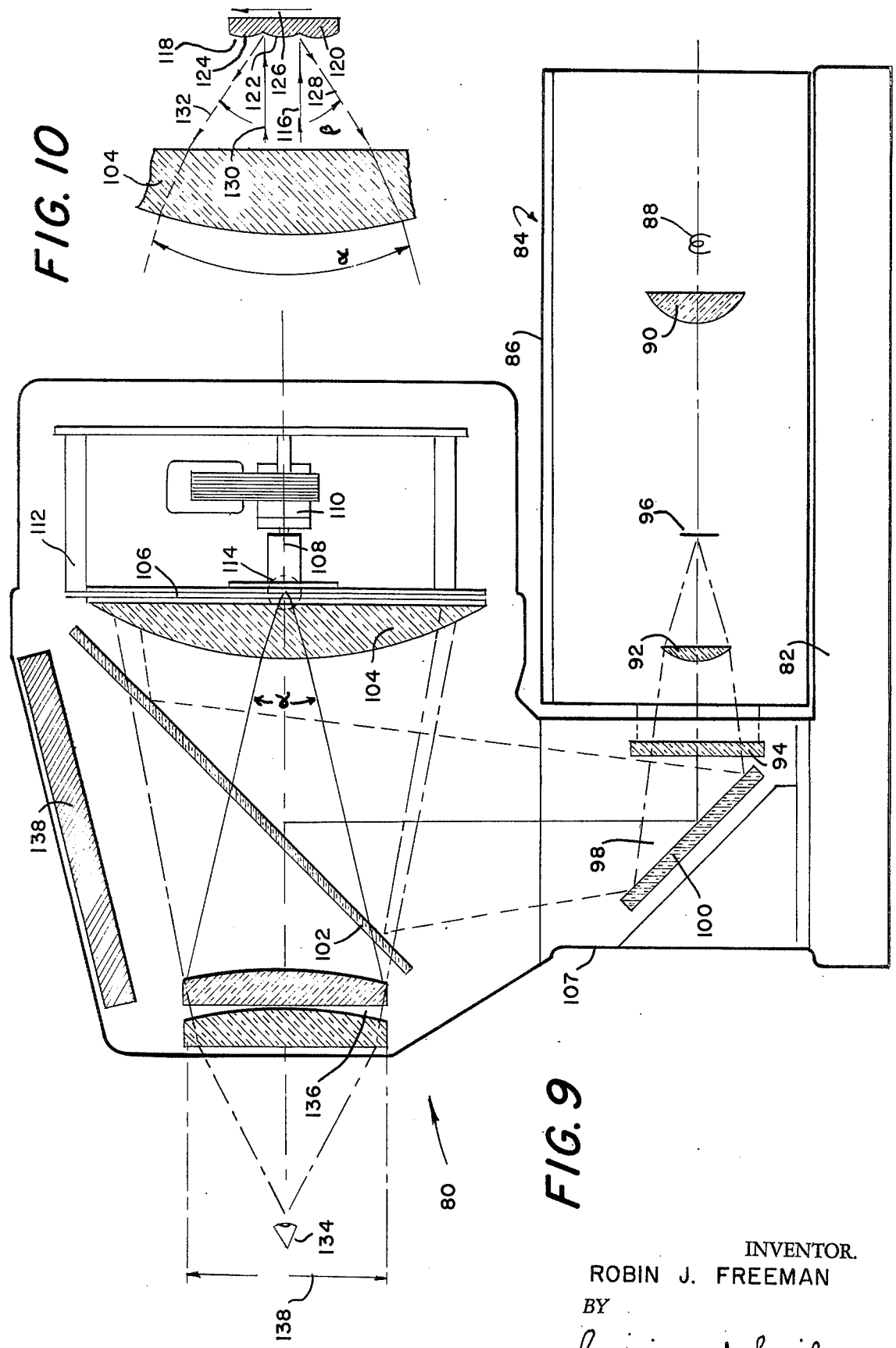

HIGH MAGNIFICATION OPTICAL APPARATUS

CROSS-REFERENCE TO RELATED APPLICATIONS

This application is a continuation-in-part of my copending application, Ser. No. 863,962, filed Oct. 6, 1969, and entitled "High Magnification Optical Apparatus," now abandoned.

BACKGROUND OF THE INVENTION

This invention is concerned with improvements in high magnification optical apparatus and its object is the elimination of the conventional eye-piece or eye-pieces in such apparatus, so that an observer is not constrained to a precise and often uncomfortable viewing position.

The invention provides in microscopes having no eye-pieces and in screen projectors an optical device producing an enlarged exit pupil which incorporates in the light path from a viewed object to the eye of an observer a series of lenticular faces which are traversed within that path at a speed above persistence of vision, the said faces being formed in such manner as to multiply the angle of light incidence to the angle of light egress as a result of such supra-persistence traverse.

In the case of a microscope it is preferred to use a reflecting system in the light path and the lenticular faces are formed as curved depressions in a polished surface.

In the case of a profile screen projector one may use a light transmission system with the lenticular faces being formed as convex protrusions on the light exit side of a clear plate. It is preferable however for the lenticules to be present on a reflective or translucent disc, which in effect is then the actual viewing screen.

The traversing or scanning of the curved faces is most simply achieved by forming them upon a circular disc which is rotated at appropriate speed.

It has been found, however, that a continuous band-type movement with reflective or translucent lenticular surfaces arranged in echelon or traverse pattern is to be preferred in certain environments where high quality definition is required. This is because of the limitation in the number of faces which can be provided near the centre of a disc.

Binocular vision in depth can be achieved in microscopes by positioning a beam splitter in the light path from a viewed object to the curved reflective faces and lens characteristics may be chosen to give a pair of exit pupils of about 2 inches diameter at the distance apart of average human eyes.

The above and other features of the invention are embodied in preferred forms of apparatus illustrated in the accompanying drawings in which:

FIG. 1 is a diagrammatic elevation of a microscope without eye-pieces.

FIG. 2 is a plan view of the microscope of FIG. 1.

FIG. 9 is a diagrammatic side view of a projector in accordance with the invention; and FIG. 10 is a cross-sectional detail view of portions of the rotating disc and field lens utilized in the FIG. 9 apparatus.

Referring first to FIGS. 1 and 2 which form the basis of a typical eyepieceless microscope, it is required to produce one circular pupil for each eye of approximately 2 inches diameter from a pupil which would normally be approximately ⅛ inch diameter.

An image from the focal plane at 'B' is magnified by primary objective 'C' and further magnified by the projection lens 'D' which in turn passes through the beam splitter prism complex 'E' to produce an image in focus on the rotating disc 'G'. Clearly two images are produced by the beam splitter and these are superimposed on the disc 'G'.

Assuming that 'G' was a plain mirror this would produce two exit pupils on the viewing plane 'A' at the normal inter-pupilliary distance. The lens 'F' in close proximity to the disc in conjunction with lens 'H' produces the pupil at the viewing plane. Lens 'H' also serves the function of increasing the apparent size of the disc 'G' and therefore increases the angle of field to the eye.

In practice the disc 'G' is formed from a highly polished plate which is provided over its surface with a large number of lenticular depressions and its speed of rotation is above persistence of vision.

Figure 3:
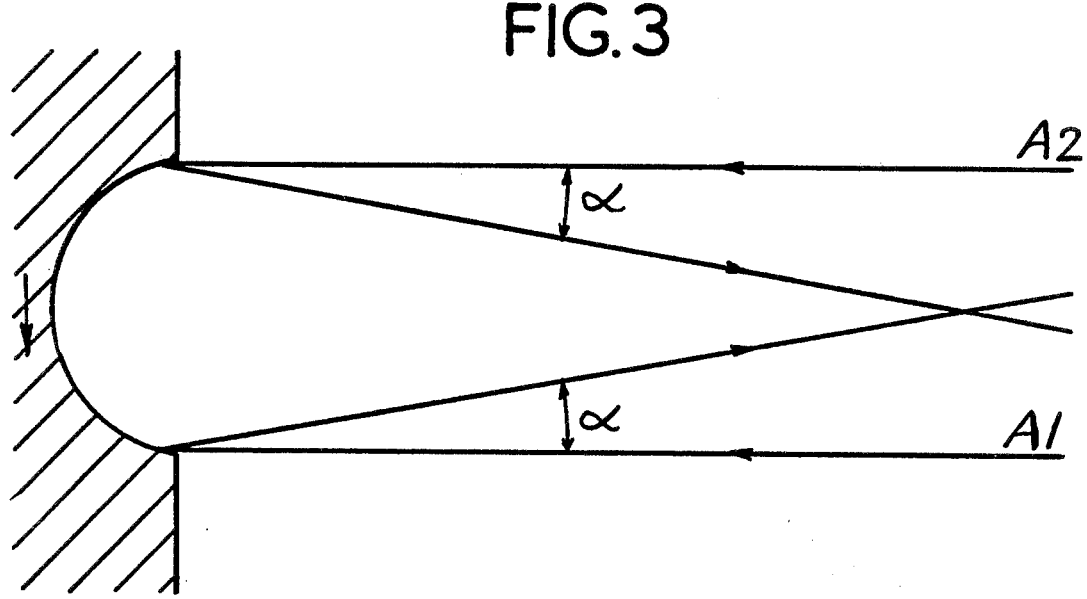
FIG. 3 is a diagrammatic enlarged section of a depressed lenticular face in a rotating disc forming part of the microscope.

If one considers FIG. 3, a typical pencil of light 'A' in position (1) will strike the edge of the depression and will reflect off at angle Alpha. As this depression scans across the pencil, angle Alpha will reduce to zero and will go out to angle Alpha at the opposite inclination. It is therefore clear that one scan of the depression will scan the pencil over an angle of 2 Alpha.

Thus as disc 'G' rotates with its large number of depressions two pupils are produced at plane 'A' in proportion to the angle 2 Alpha, thereby making it unnecessary to have eyepieces and providing greater ease of operator viewing.

The angle Alpha can be altered at will and is clearly a function of the radius of curvature of the depressions and the depth of the depressions.

The lens 'F' is designed so that the diverging rays forming the pupil are collimated to strike the disc 'G' at right angles, as viewed in plan, and further transmission of this light through lens 'F' after reflection by disc 'G' converges these rays to form the pupil at plane 'A', after passing through lens 'H'.

Figure 4:
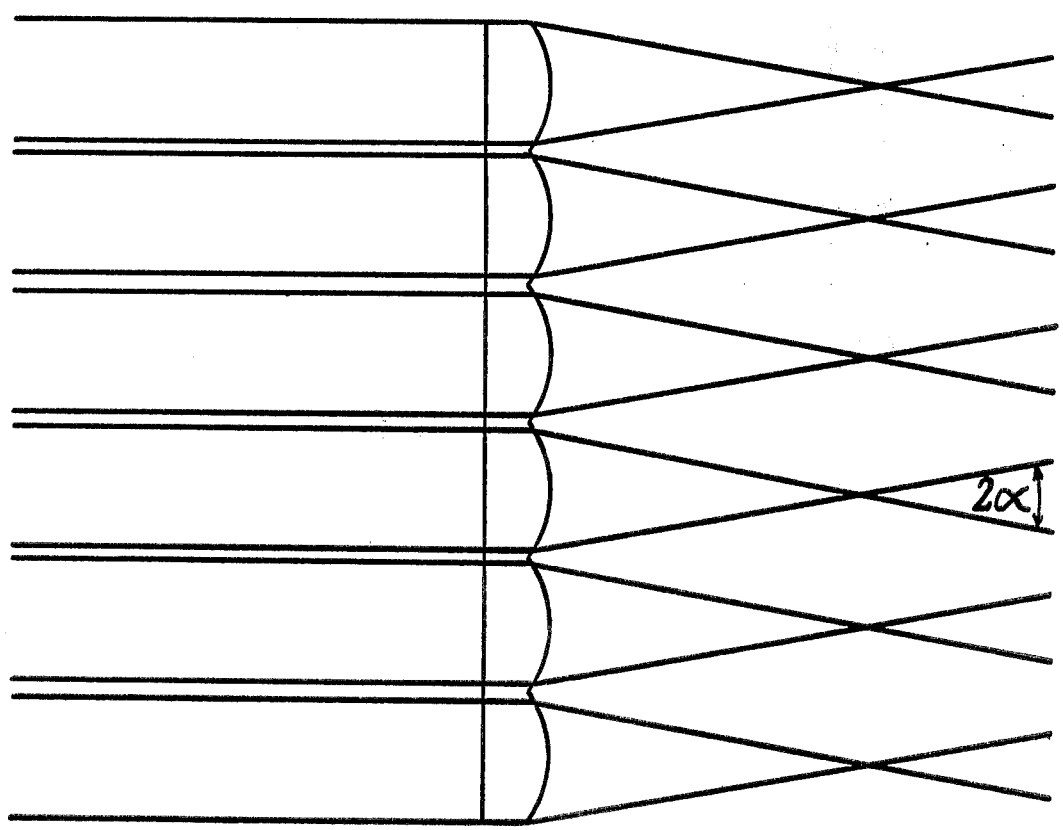
FIG. 4 is a diagrammatic enlarged section of part of a transparent disc formed with convex lenticular protrusions.

The portion of a rotating disc shown in FIG. 4 illustrates how the principle of the invention can be applied to a translucent disc interposed in a light path, for example in a profile screen projector.

Pencils of light rays are shown passing through the disc from left to right and it can be seen how the angle of light egress is multiplied on leaving the lenticular convex protrusions.

Figure 6:
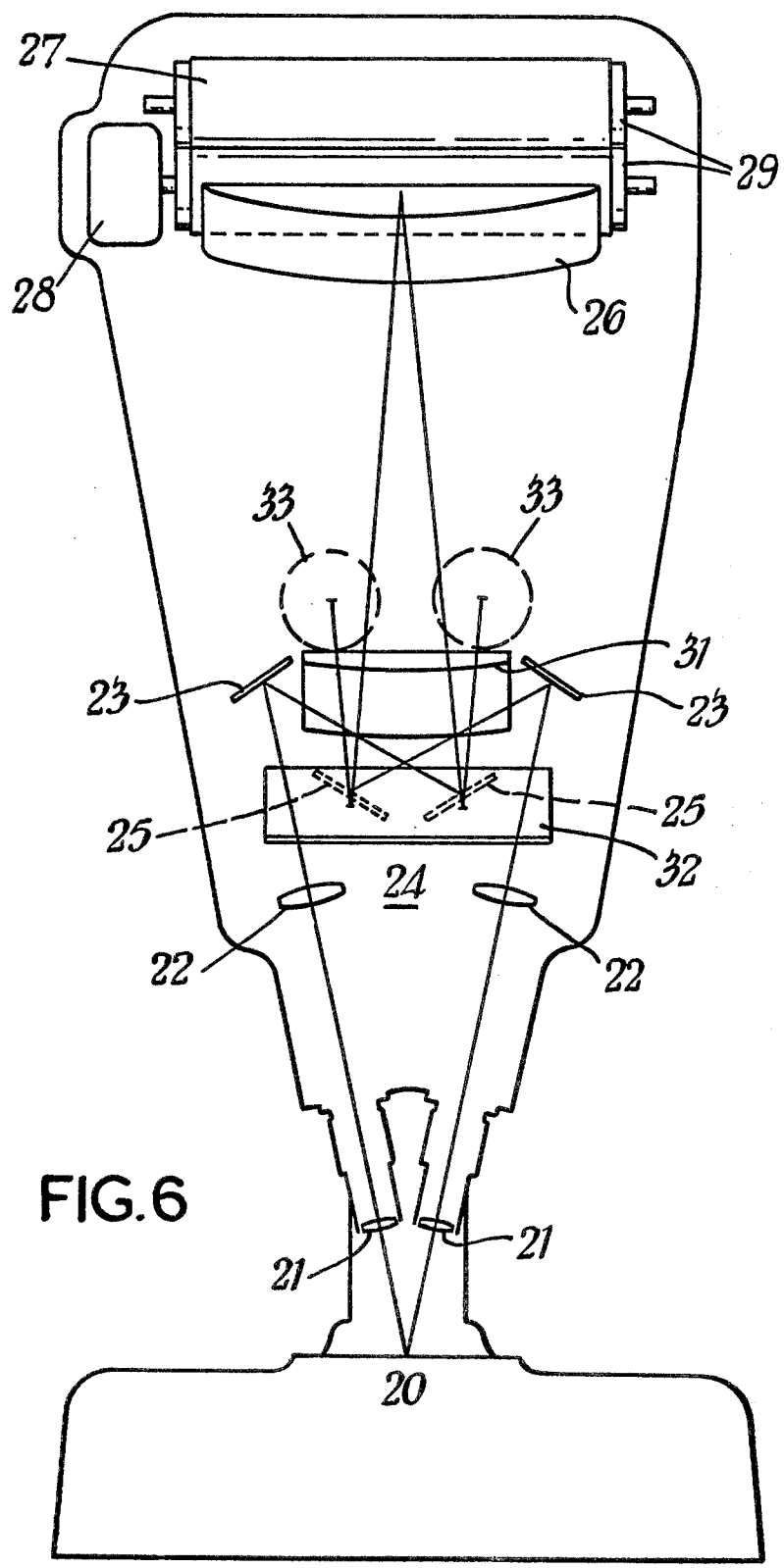
FIG. 6 is a diagrammatic front view of a binocular stereoscopic microscope employing a continuous band reflector.
Figure 7:
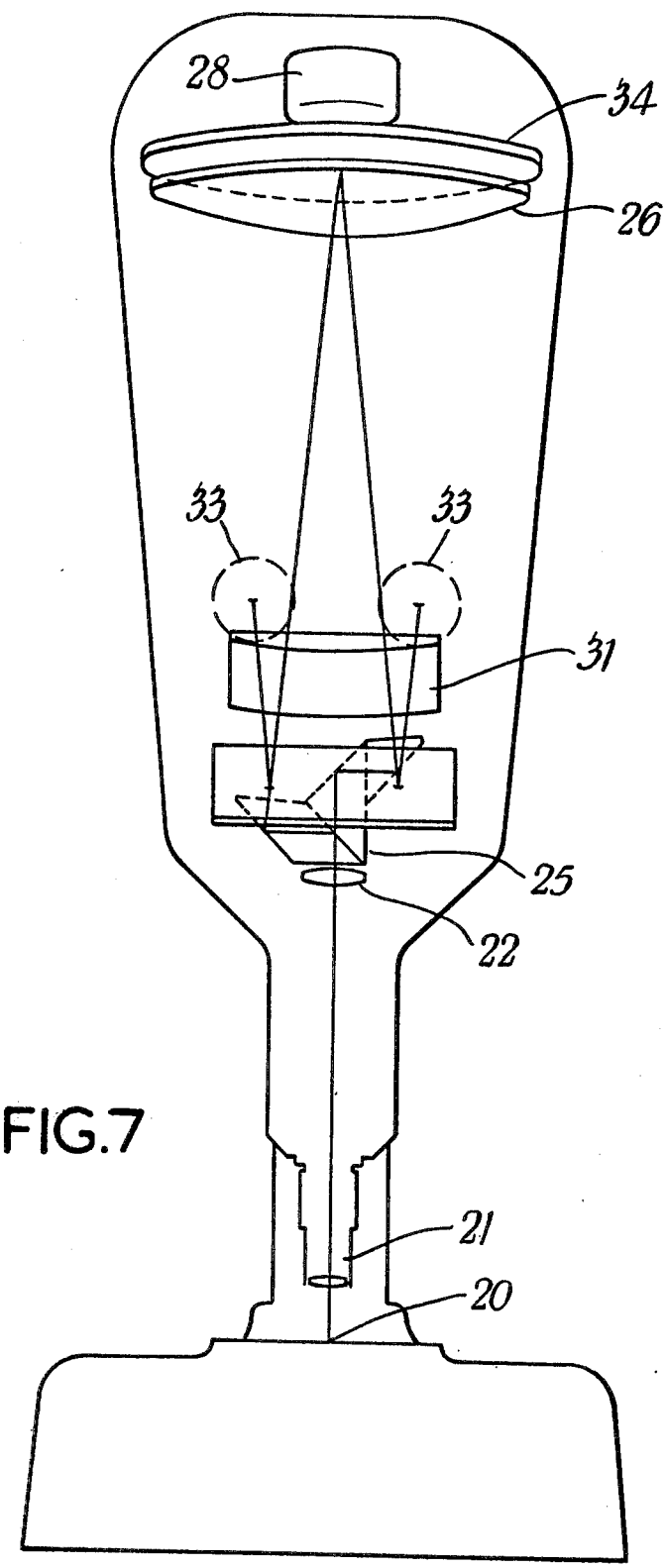
FIG. 7 is a diagrammatic front view of a non-stereoscopic microscope employing a disc reflector.
Figure 8:
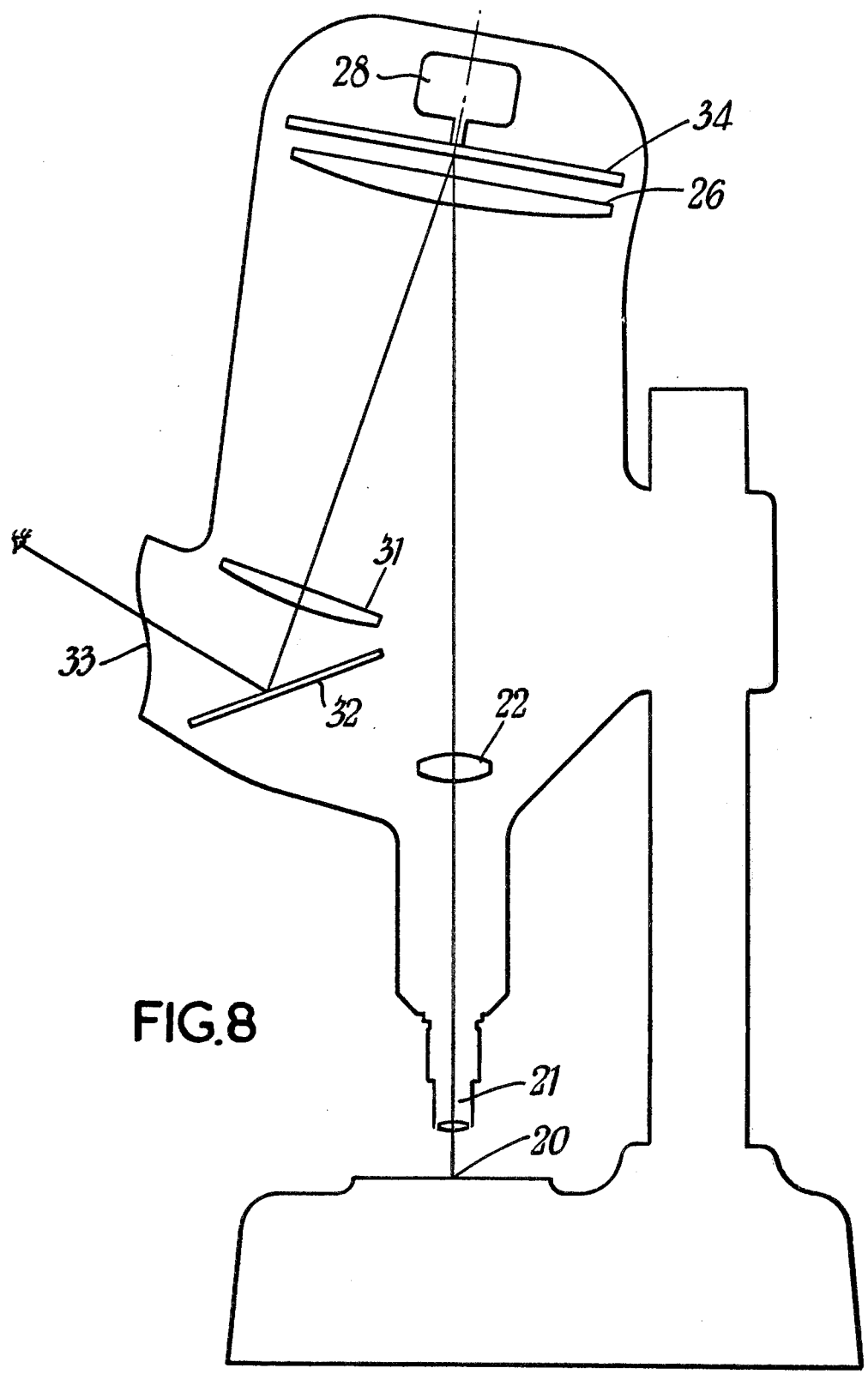
FIG. 8 is a diagrammatic side view of a microscope employing a disc reflector and providing an exit pupil large enough to provide an image to both eyes.

Practical forms of microscopes embodying the optical system of the invention are illustrated in FIGS. 6, 7, and 8 of the drawings.

In the form of microscope illustrated in FIG. 6 the viewed object is located at 20 and its image is projected through objective lenses 21 and projection lenses 22 to angled mirrors 23 forming part of beam splitter complex 24.

The light ray pencils are then transmitted from mirrors 25 through first field lens 26 to focus in the plane of the band 27.

Figure 5:
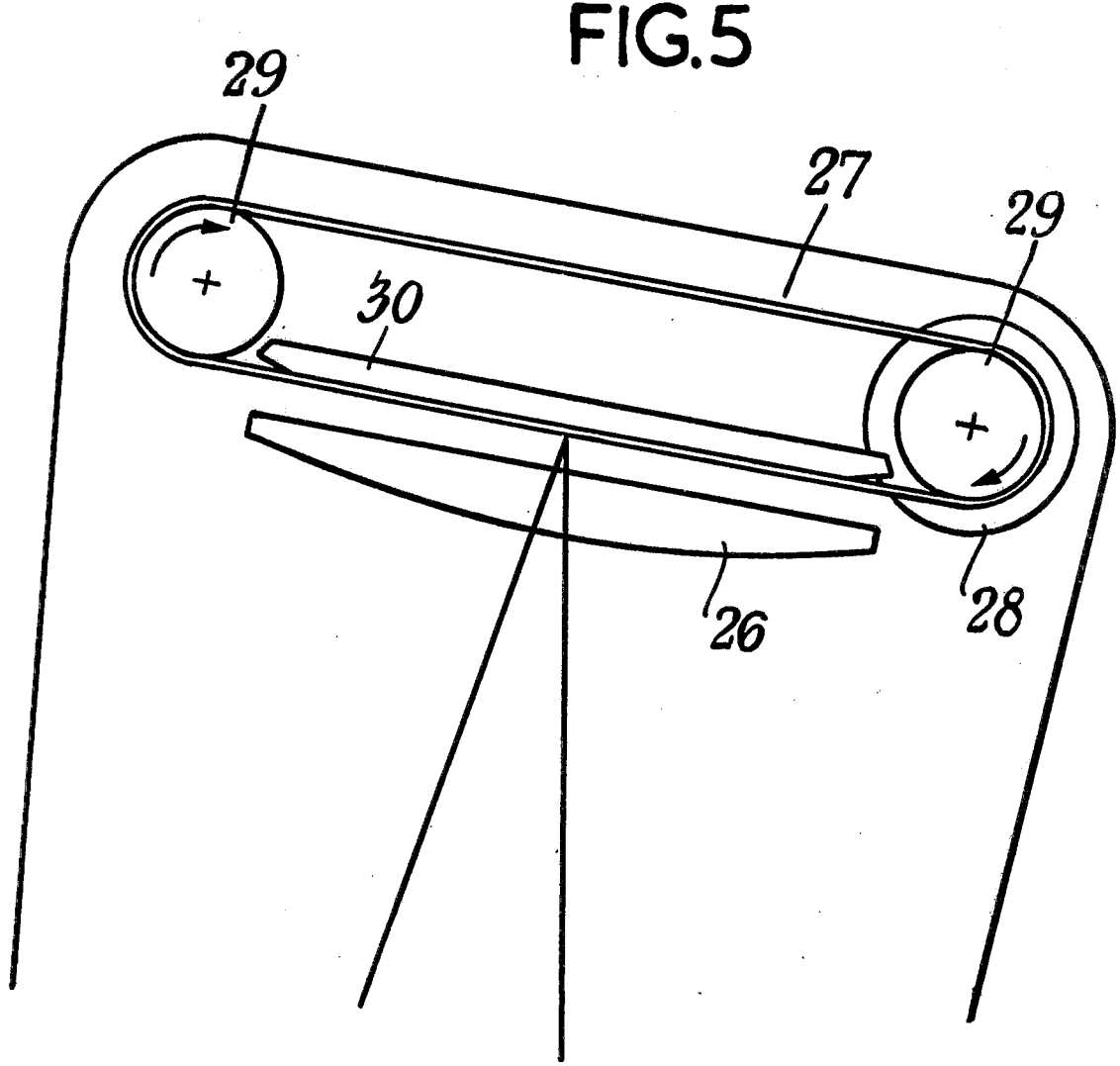
FIG. 5 is a diagrammatic side view of a continuous band having reflective surfaces.

The band 27 driven by motor 28 at a speed above persistence of vision over rollers 29 and in contact with an anti-flutter plate 30 is shown in side view in FIG. 5. It is made from vacuum aluminised plastics material and formed with series of lines of lenticular depressions (not shown) in echelon or helical arrangement.

The light ray pencils reflected back from the fast moving depressions at greater angle of egress than their angle of incidence pass through final field lens 31 and are further reflected by mirror 32 to wide exit pupils (indicated by dash line circles 33) in the front cover of the microscope body.

These exit pupils, of approximately 2 inches in diameter, are located at normal interpupilliary distance and an observer is presented with a highly magnified stereoscopic image of the object at 20 without the use of eye-pieces.

A non-stereoscopic form of microscope is shown in FIG. 7, in which like reference numbers are used for similar items to those of FIG. 6.

The image of an object at 20 is projected through a single objective lens 21 and projection lens 22 to beam splitter complex 25'.

The light ray pencils are reflected from the beam splitter (compare E, FIGS. 1 and 2) through first field lens 26 to be reflected from lenticular depressions in disc 34 rotated by motor 28.

The enlarged pencils are then projected through final field lens 31 and reflected by mirror 32 to wide exit pupils represented by dash line circles 33.

This form of microscope will not produce such a clearly defined image as that of FIG. 6 due to the impossibility of providing a sufficiency of lenticular depressions near the centre of the disc 34.

This gives rise to a series of black rings in the final image. The difficulty could be largely met by using only the outer portion of a larger disc but the belt form of reflector of FIG. 6 is to be preferred since the lines of lenticular depressions are angled to provide a homogeneous image, or put another way, the small circular images on the surface of each lenticular form touch each other during motion to produce a complete picture.

The microscope shown in FIG. 8 is of a very simple form. The beam splitter complex of the earlier described forms is eliminated but the lenticular depressions of disc 34 are designed to give a much larger exit pupil of say 5 inches in diameter. This of course entails the use of much greater object illumination and limits its use to cases where sub-stage lighting only is required, as for example in research microscopes.

In FIG. 9 a diagrammatic side view appears of a projector 80 in accordance with the invention. Projector 80 is seen to include a base 82 upon which is positioned conventional projection means 84. Means 84 is illustratively shown as comprising a 35mm projector including a casing 86 in which are suitably mounted a light source 88, condenser lens 90, and projection lens 92. All these elements are conventional and may be regarded as illuminating and projecting through the front end 94 thereof an image of an object such as a transparency or piece of microfilm, etc. positioned at film plane 96. While conventional projection means 84 is thus illustratively shown as a lantern slide type of projector, it will be evident that means 84 could also comprise other conventional projective means, as for example an opaque projector — or epidiascope — or so forth.

The beam 98 emergent from means 84 is reflected from an angularly adjustable plane mirror 100 to beam splitter mirror 102, a conventional semi-silvered device, which reflects a principal portion of the beam through a circular field lens 104 and to a focus upon lenticulated disc 106. The latter element is a rotatable member, the surface of which bears multiple lenticular impressions and is aluminized or otherwise rendered highly reflective. The lenticules present at disc 106 are minute, typically having radii of the order of 0.010 inches. The disc is rotated during projector operation by a shaft 108 driven by a motor 110, which combination typically drives disc 106 at rotational speeds of the order of 2,000 R.P.M. The entire assembly of motor, rotating disc and drive shaft is mounted to the viewer support frame 107 of projector 80 by anti-vibration mounts 112.

The manner in which images are enlarged to the eye of the viewer by projector 80 is best understood by reference to the enlarged detail view of FIG. 10, which sets forth details of the portion of FIG. 9 within the dotted circle 114. As seen therein the reflective surface 118 of disc 106 includes a series of lenticulated surface portions such as 120, 122, 124, etc. of spherical radii. The surface 118 is assumed to be moving in the direction of arrow 126 due to the rotation of disc 106, so that the said lenticulated portions scan in transverse fashion across incoming ray traces. Accordingly a ray 116 is reflected as ray 128 at one edge of lenticule 122, and a ray 130 at the opposite edge of the same lenticule as ray 132. Hence it is clear that an incoming pencil of rays in scanning across a moving lenticule is reflected at a total included reflectance angle $\beta$. It is further seen that upon passing outwardly through field lens 104 the included reflected angle for such pencil is changed to the depicted angle $\alpha$, which clearly represents an angular enlargement of the incoming pencil. And it is this enlarged pencil, in accordance with the principles of the invention, which (due to persistence of vision) will be observed by the viewer at 134 after further modification.

As thus seen in FIG. 9, the beam re-emerging through field lens 104 passes through beam splitter mirror 102, and finally through front field lenses 136 to the viewer at 134, the generated pupil being suggested at 138. Because a certain amount of light is necessarily lost at beam splitter mirror 102, an anti-reflection (absorption) device 138 is positioned above mirror 102 in the path of light which may be transmitted through mirror 102 from mirror 100.

In considering FIG. 9, it should be appreciated that the disc 106 effectively acts as a viewing screen; however the increased exit pupil size at 138 resulting from use of the rotating disc 106 enables projector means 84 to be located nearer to the viewing screen than is normally practical, with concomitant advantages in space saving.

It should also be borne in mind in connection with the FIG. 9 embodiment of the invention, that the reflective disc 106 could be replaced by a translucent lenticulated disc with the beam path from projector means 84 being suitably altered as to pass such beam through the translucent lenticular so as to form an apparently enlarged image for viewing beyond the front field lenses.

As will be clear to those skilled in the art the optical device of the invention can be usefully employed for light transmission applications by employing the technique illustrated diagrammatically in FIG. 4.

The material of the disc or belt traversing the light path between projector and screen would be clear, and be formed or embossed with lenticular surfaces.

Various applications can be envisaged in the fields of small screen display, teaching aids, sales promotion films and so on.

I claim:

1. Apparatus producing an enlarged exit pupil, comprising:
    a. means for positioning at said apparatus an object to be viewed;
    b. objective lens means spaced from said object;
    c. projection lens means spaced from said objective lens means in the optical path proceeding from said objective lens means;
    d. first field lens means positioned in said optical path beyond said projection lens means;
    e. a reflective lenticulated surface over which discrete lenticules are distributed positioned in said optical path beyond said first field lens means at focal plane of the image so that each lenticule reflects light incident thereon back through said first field lens means;
    f. second field lens means positioned in the continuing optical path reflected from said lenticulated surface;
    g. reflecting means on the side of said second field lens means opposite said lenticulated surface and oriented to reflect the light incident thereon to the eye of an observer, and
    h. means to provide uniform motion of said lenticulated surface in a direction to cause the depressions of said lenticules to scan across light pencils incident thereon at a speed such that the persistence of vision and form of the said depressions of said lenticules effectively multiplies the angle of light egress from said surface of said light pencils whereby effectively to produce said enlarged exit pupil at the eye of said observer.

2. The invention of claim 1, wherein said apparatus is a microscope.

3. An apparatus according to claim 1, wherein said lenticulated surface is present upon an endless belt carrying said lenticules.

4. Apparatus according to claim 1, further including beam splitting means positioned in said optical path between said eyepiece projection lens means and said first field lens means, and adapted for providing dual reflected optical paths from said lenticulated surface, whereby to yield two exit pupils at normal interpupilliary distance.

5. Apparatus according to claim 4, wherein two objective lens means are provided whereby to provide stereoscopic images at said normal interpupilliary distance.

6. Apparatus according to claim 5, wherein said lenticulated surface is present upon an endless belt carrying said lenticules; and said means for moving said surface comprises a pair of rollers engaging said belt and motive means for at least one of said rollers.

* * * * *

UNITED STATES PATENT OFFICE
CERTIFICATE OF CORRECTION

Patent No. 4,012,109　　　　　　　　　Dated March 15, 1977

Inventor(s) Robin John Freeman

It is certified that error appears in the above-identified patent and that said Letters Patent are hereby corrected as shown below:

Column 1, line 2, "863,962" should be --863,952--;

Claim 1, line 13, after "at" insert --a--.

Signed and Sealed this twenty-sixth Day of July 1977

[SEAL]

Attest:

RUTH C. MASON
*Attesting Officer*

C. MARSHALL DANN
*Commissioner of Patents and Trademarks*